United States Patent [19]

Andow et al.

[11] 4,212,046
[45] Jul. 8, 1980

[54] DISTANCE RELAYING SYSTEMS

[75] Inventors: Fumio Andow, Hachioji; Tetsuo Matsushima, Takaido-Higashi; Eiichi Okamoto, Tokyo, all of Japan

[73] Assignees: Tokyo Shibaura Denki Kabushiki Kaisha; Tokyo Denryoki Kabushiki Kaisha, both of Japan

[21] Appl. No.: 904,264

[22] Filed: May 9, 1978

[30] Foreign Application Priority Data

May 16, 1977 [JP] Japan ................... 52-55418

[51] Int. Cl.$^2$ ............................. H02H 3/38
[52] U.S. Cl. ................................. 361/80
[58] Field of Search ............ 361/80, 79, 81, 82, 361/83

[56] References Cited

U.S. PATENT DOCUMENTS

| 3,569,785 | 3/1971 | Durbeck | 361/80 |
| 3,731,152 | 5/1973 | Rockefeller, Jr. | 361/80 |
| 3,931,502 | 1/1976 | Kohlas | 361/80 X |
| 3,984,737 | 10/1976 | Okamura et al. | 361/80 |
| 4,107,778 | 8/1978 | Nii et al. | 361/80 X |

*Primary Examiner*—Harry E. Moose, Jr.
*Attorney, Agent, or Firm*—Stevens, Davis, Miller & Mosher

[57] ABSTRACT

In a digital distance relaying system the principle of comparing the amplitude values of alternating current quantities is used. In one example, amplitude values of $\dot{V}$ and $\dot{V}-\dot{I}Z$ are compared and in the other example the amplitude values of $\dot{V}-\dot{I}Z$ and $\dot{I}Z$ are compared for determining the operating point of the relay system.

4 Claims, 15 Drawing Figures

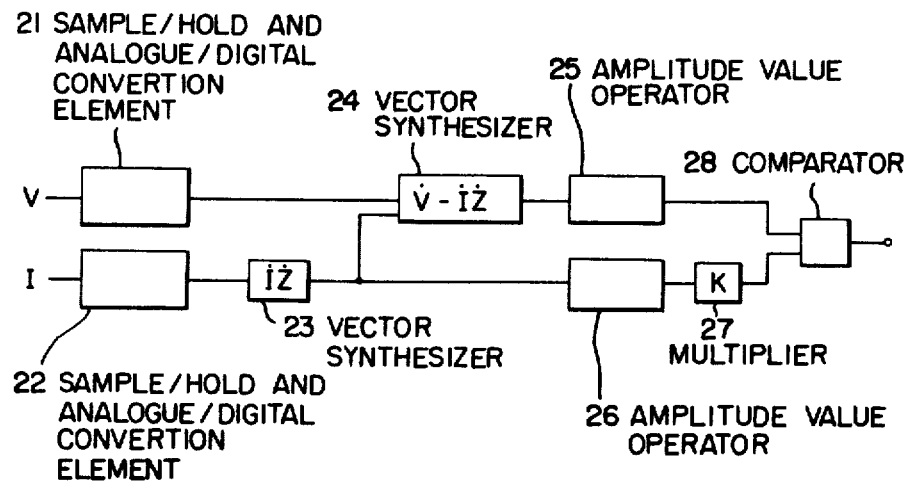
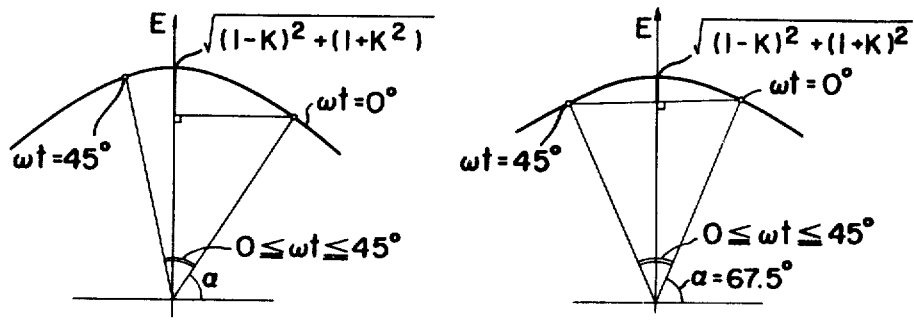

DISTANCE RELAYING SYSTEMS

BACKGROUND OF THE INVENTION

This invention relates to a digital distance relaying system in which digital signals are used to protect electric power systems.

Although many types of distance relays have been proposed, according to one type the absolute values of two vectors are compared with each other. FIG. 1 of the accompanying drawings shows one example of comparing reactance characteristics wherein the operating point of the relay is judged according to the following equation 1.

$$|\dot{V} - \dot{I}\dot{Z}| > |\dot{V}| \tag{1}$$

where $\dot{Z} = |\dot{Z}| < 90°$, $\dot{V}$ and $\dot{I}$ represent voltage and current and Z an impedance in vector corresponding to the distance from the location of the relay to the limit of the protected area. In equation 1, it is possible to vary the inclination angle of the characteristic curve as desired by varying the angle of the set vector $\dot{Z}$, thereby obtaining a blinder characteristic for power flow. FIGS. 2a and 2b are vector diagrams showing the application of the principle to mho characteristics. This operation is expressed by the following equation 2. FIG. 2a shows a case of $K \neq 1$ representing an offset mho characteristic and FIG. 2b shows a case of $K = 1$ showing a mho characteristic where K represents a constant.

$$K|\dot{I}\dot{Z}| > |\dot{V} - \dot{I}\dot{Z}| \tag{2}$$

where $\dot{Z} = |\dot{Z}| < \theta$ and $\theta$ represents the maximum sensitivity angle.

FIG. 3 is a block diagram showing an electric circuit of this invention for obtaining the reactance characteristic shown in FIG. 1. In FIG. 3, 11 and 12 show circuit elements which sample input voltage and current signals at a definite interval and hold and convert sampled analogue signals into digital signals. A vector synthesizer 13 is connected to the output of the element 12 for producing a vector $\dot{I}\dot{Z}$. A vector synthesizer 14 is connected to the outputs of the elements 11 and 12 to produce an output $\dot{V} - \dot{I}\dot{Z}$. Amplitude value operators 15 and 16 are respectively connected to the outputs of element 11 and vector synthesizer 14 for obtaining the absolute values of the vectors shown in equation 1 by determining the amplitude values of the input alternating current data. The outputs of the amplitude value operators 15 and 16 are compared by a comparator 17 to judge that whether equation 1 holds or not. When equation 1 holds, the comparator 17 produces an output which is used to actuate the relay system.

FIG. 4 is a block diagram showing a circuit of this invention for obtaining the mho or offset mho characteristic shown in FIGS. 2a and 2b. There are provided sample/hold and A/D converting elements 21 and 22 similar to the elements 11 and 12 shown in FIG. 3 and vector synthesizers 23 and 24 which are similar to vector synthesizers 13 and 14 shown in FIG. 2 and form vectors $\dot{I}\dot{Z}$ and $\dot{V} - \dot{I}\dot{Z}$ respectively. There are also provided amplitude value operators 25 and 26 which produce the absolute values of the input vectors similar to the amplitude value operators 15 and 16 shown in FIG. 2. The output of the amplitude value synthesizer 26 is multiplied by a constant K by a multiplier 27. Where $K = 1$ and a mho characteristic is desired it is necessary to provide a memory action for nearby faults. To this end it is necessary to use voltage data one cycle before. A comparator 28 is used to compare the outputs of the amplitude value operator 25 and the multiplier 27 to perform the judgment shown by equation 2.

As the amplitude value calculating operations made by operators 15 and 16 shown in FIG. 3 and the operators 25 and 26 shown in FIG. 4, there have been used amplitude squaring method and rectification-addition method.

The amplitude squaring method utilizes the principle expressed by $$\sin^2\omega t + \cos^2\omega t = \sin^2\omega t + \sin^2(\omega t + 90°) = 1$$

Thus, two sampled values of the input AC quantity having a phase difference of 90° are used and the sum of their squares is calculated to obtain the square of the amplitude value of the input AC quantity. The advantage of the amplitude squaring method lies in that the amplitude value can be obtained from a minimum of two sampled values and that it does not accompany any calculation error as a principle. On the other hand, there is a defect that it is necessary to calculate squares or square roots during calculation. When such calculations are made by a digital computer, calculations for multiplication, division and square roots require much longer time than mere addition and subtraction operations.

According to the rectification-addition method the absolute values of the sampled values corresponding to one half cycle or an integer multiple thereof of the input AC quantity are added together. For example, where the frequency of the input AC is 50 Hz and the sampling frequency is 600 Hz (a sampling interval of 30°) the added value is shown by the following equation $$\begin{aligned} E = & |\sin\omega t| + |\sin(\omega t + 30°)| + |\sin(\omega t + 60°)| \\ & + |\sin(\omega t + 90°)| + |\sin(\omega t + 120°)| \\ & + |\sin(\omega t + 150°)| \end{aligned} \tag{3-1}$$

When a periodicity is considered, the value of equation (3−1) is included in a range shown by the following equation.

$$E = 2(\cos 75° + \cos 45° + \cos 15°)\sin(\omega t + 75°) \tag{3-2}$$

where $0 \leq \omega t \leq 15°$.

According to this method, although it is possible to calculate the absolute value only by addition operations, it is necessary to use a number of sampled values (in the above described example, (6). Furthermore, there is a calculation error caused by the sampling times. In the illustrated example, this error varies about ±1.7% about the center of variation.

The following method has been proposed to eliminate the defects of said two prior art methods, which is expressed by $$E = |Si| + \left|Si + \frac{h}{4}\right| + K\left|\left|Si + \frac{h}{4}\right| - |Si|\right| \tag{4}$$

where i represents a time series, and h the number of samplings in one cycle. In other words, Si and Si+(h/4) represent sampled values having a phase difference of 90 electric degrees. For simplicity, let us assume that the original wave Si is a sine wave having an amplitude value of unity. Then equation 4 can be rewritten as follows.

$$E = |\sin\omega t| + |\sin(\omega t + 90°)| + K | |\sin\omega t| - |\sin\omega t + 90°| | = |\sin\omega t| + |\cos\omega t| + K | |\sin\omega t| - |\cos\omega t| | \quad (5)$$

where the periodicity is considered the range in which the value E shown by equation 5 is included is shown by the following equation.

$$E = (1 - K)\sin\omega t + (1 + K)\cos\omega t \quad (6)$$
$$= \sqrt{(1 - K)^2 + (1 + K)^2} \sin(\omega t + \alpha)$$

where $0 < \omega t < 45°$ $$\sin\alpha = (1 + K)/\sqrt{(1 - K)^2 + (1 + K)^2}$$
$$\cos\alpha = (1 - K)/\sqrt{(1 - K)^2 + (1 + K)^2}$$

The values of E calculated by equation 6 are shown in FIG. 5a. When constant K is selected to be 0.414, $\alpha$ becomes $\alpha = 67.5°$ and the values of E calculated by equation 6 are shown in FIG. 5b which shows that the error due to the sampling time is a minimum. Under these conditions the error about the center of variation of the value of E is ±3.96%. Although this method is superior than said two methods in that the amplitude value can be calculated by adding together only two sampled values, it is defective in that the operation error is larger.

SUMMARY OF THE INVENTION

Accordingly, it is an object of this invention to provide an improved distance relaying system capable of decreasing error due to sampling time thus improving the distance measuring characteristics.

According to one aspect of this invention there is provided a digital distance relaying system comprising first means for determining an alternating current quantity $\dot{V}-\dot{I}\dot{Z}$, where $\dot{V}$ and $\dot{I}$ represent voltage and current of an alternating current system and $\dot{Z}$ a vector, second means for determining the amplitude value of the voltage $\dot{V}$, third means for determining the amplitude value of the alternating current quantity $\dot{V}-\dot{I}\dot{Z}$, and fourth means for comparing the outputs of the second and third means for determining the operating point of the relaying system.

According to another aspect of this invention there is provided a digital distance relaying system comprising first means for determining an alternating current quantity $\dot{V}-\dot{I}\dot{Z}$ where $\dot{V}$ and $\dot{I}$ represent voltage and current of an alternating current system and $\dot{Z}$ a vector, second means for determining the amplitude value of $\dot{I}\dot{Z}$, third means for determining the amplitude value of $\dot{V}-\dot{I}\dot{Z}$, and fourth means for comparing the outputs of the second and third means for determining the operating point of the relaying system.

BRIEF DESCRIPTION OF THE DRAWINGS

In the accompanying drawings:

FIGS. 3 and 4 are block connection diagrams utilized in this invention for calculating the amplitude values;

FIGS. 5a and 5b are vector diagrams showing the ranges of variation of E in which FIG. 5a shows a general case and FIG. 5b a case in which the range of variation of E is a minimum;

FIG. 6 is a block diagram showing one example of the amplitude value calculating circuit embodying the invention;

DESCRIPTION OF THE PREFERRED EMBODIMENTS

Figure 1:
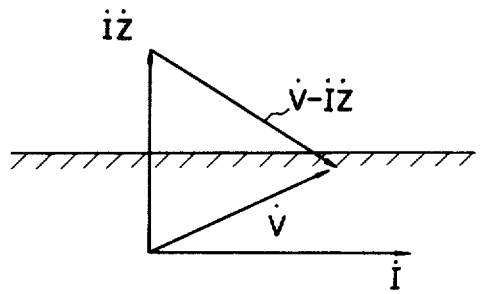
FIG. 1 is a vector diagram showing the principle of the reactance characteristic utilized in the arithmetic operation of the amplitude value.
Figure 2A:
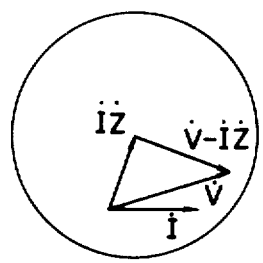
FIGS. 2a and 2b are vector diagrams utilized to explain the offset mho and mho characteristics in the arithmetic operation of the amplitude value.
Figure 2B:
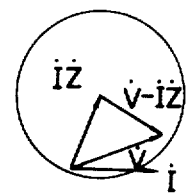
Figure 3:
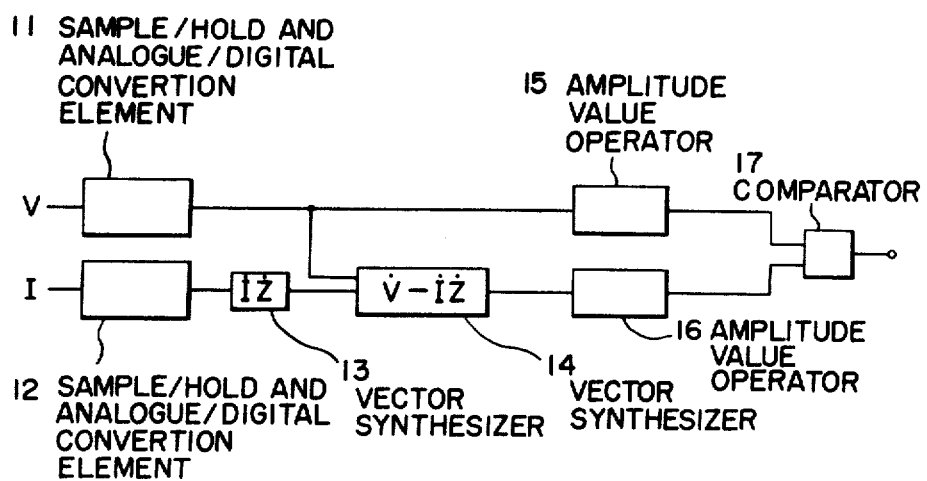

In the embodiment of the amplitude value operator 3' shown in FIG. 6 it is assumed that the frequency of the input alternating current is 60 Hz and that the sampling frequency is 600 Hz. In this case the sampling period is 30° and the number n of samplings during 90 electric degrees is 3. In FIG. 6, 1 represents a sampled value of the input AC quantity. The amplitude value operator 3' comprises an operating circuit 2 which compares two sampled values having a phase difference of 90° and calculates the value of E according to equation 7 by using a signal Max($|Sm|$, $|Sm+h/4|$) having larger absolute value and a signal Min($|Sm|$, $|Sm+h/4|$).

Thus, $$E = K_{11}\text{Max}(|Sm|, |Sm + \frac{h}{4}|) + K_{12}\text{Min}(|Sm|, |Sm + \frac{h}{4}|) \quad (7)$$

in which $K_{11}$ and $K_{12}$ are constants. The amplitude value operator 3' further comprises an addition circuit 3 which adds three times the output E of the operation circuit 2, corresponding to the number of samplings.

If desired, the operating circuit 2 and the addition circuit 3 may be combined into an integral unit.

The manner in which the output $\Sigma E$ of the addition circuit 3 varies will now be considered. In equation 7, since Sm and Sm+(h/4) represent sampled values having a phase difference of 90 electrical degrees and since it has already been assumed that the original wave of Sm is a sine wave having a unity amplitude value, and that $|\sin\omega t| > |\sin(\omega t - 90°)|$, equation 7 can be modified into equation 8 in view of the periodicity of the sine wave.

$$E = K_{11}\sin\omega t + K_{12}\sin(\omega t - 90°) \quad (8)$$
$$= K_{11}\sin\omega t + K_{12}\cos\omega t$$

where $0 \leq \omega t \leq 45°$

Figure 7A:
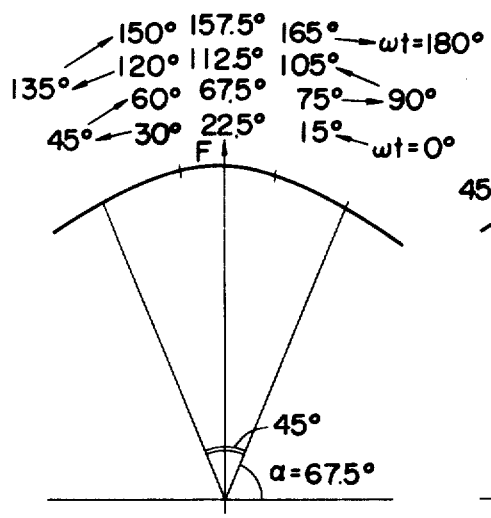
FIGS. 7a and 7b are vector diagrams showing the periodic variation of the value of E where the sampling period is made to be 30° and 18° respectively.

By substituting $K_{11} = 1 - K$ and $K_{12} = 1 + K$ in equation 8, equation 8 becomes equal to equation 6. Due to the sampling time ωt the output of the operation circuit 2 varies periodically according to a relation $0 \leq \omega t \leq 45°$. The relationship between ωt and the output E(ωt) is shown by a curve shown in FIG. 7a where K=0.414 and hence $\alpha=67.5°$. The sum of the outputs E(ωt), E(ωt+30°) and E(ωt+60°) of the operation circuit 2 at an interval of 30°, and hence the output $\Sigma E=E(\omega t)+E(\omega t+30°)+E(\omega+60°)$ of the addition circuit 3 has a periodicity in a range of $0<\omega t<15°$ which can be noted when one analyzes the curve shown in FIG. 7a. As shown by FIG. 7a, the range of ΣE is expressed by $$\Sigma E = \sin(\omega t + \alpha) + \sin(\omega t + \alpha + 30°) + \sin(-\omega t + \alpha + 30°) = \cos\alpha \cdot \sin\omega t + \sin\alpha \cdot \cos\omega t + 2\sin(\alpha + 30°) \cdot$$

$$\cos\omega t = \sqrt{\cos^2\alpha + [\sin\alpha + 2\sin(\alpha + 30°)]^2} \quad .$$

$$\sin(\omega t + \theta) \quad (9)$$

where $$\sin\theta = (\sin\alpha + 2\sin(\alpha + 30°)/\sqrt{\cos^2\alpha + [\sin\alpha + 2\sin(\alpha + 30°)]^2}$$

$$\cos\theta = \cos\alpha/\sqrt{\cos^2\alpha + [\sin\alpha + 2\sin(\alpha + 30°)]^2}$$

Figure 8A:
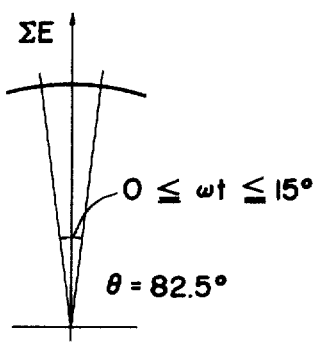
FIGS. 8a and 8b are vector diagrams showing the range of variation of $\Sigma E$ where the sampling period is made to be 30° and 18° respectively.

When $\alpha=67.5°$ is substituted, θ becomes 82.5° and the value of ΣE varies by ±0.43% about a center value as shown in FIG. 8a due to the relationship $0 \leq \omega t \leq 15°$.

With the same sampling frequency, the operation error was ±1.7% were rectification-addition method was used. This shows that according to this invention, the amplitude value of the input AC quantity, that is, the distance measuring characteristic of a distance relaying system can be determined at high accuracies even though only an addition circuit is used. The accuracy can be improved further by selecting a suitable sampling frequency. An example wherein the frequency of the input AC is 50 Hz, the sampling frequency is 1000 Hz and hence n=5 and the sampling period is 18° will be described in the following.

Figure 7B:
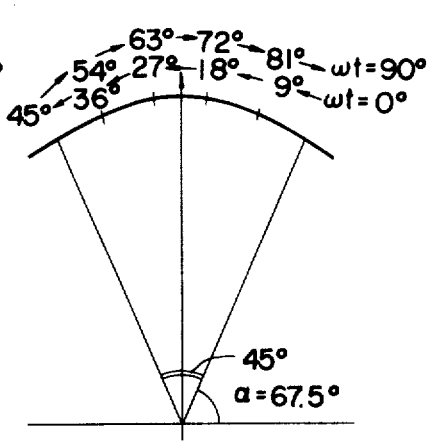

By denoting the output of the operation circuit at any time by Σ(ωt), the output ΣE of the addition circuit 3 is expressed by $$\Sigma E = E(\omega t) + E(\omega t + 18°) + E(\omega t + 36°) + E(\omega t + 54°) + E(\omega t + 72°)$$

and the range of the value of ΣE can be expressed as follows in view of the periodicity thereof shown in FIG. 7b.

$$\Sigma E = \sin(\omega t + \alpha) + \sin(\omega t + \alpha + 18°) + \sin(\omega t + \alpha + 36°) + \sin(-\omega t + \alpha + 36°) + \sin(-\omega t + \alpha + 18°) \quad (10)$$

where $0 \leq \omega t \leq 9°$, $\alpha=67.5°$ and $$\cos\theta = \frac{\sin\theta = [\sin\alpha + 2\sin(\alpha + 18°) + 2\sin(\alpha + 36°)]/\sqrt{\cos^2\alpha + [(\sin\alpha + 2\sin(\alpha + 18°) + 2\sin(\alpha + 36°)]^2}}{\cos\alpha/\sqrt{\cos^2\alpha + [\sin\alpha + 2\sin(\alpha + 18°) + 2\sin(\alpha + 30°)]^2}}$$

Figure 8B:
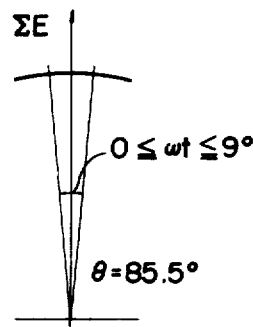

By substituting $\alpha=67.5°$ we obtain $\theta=85.5°$. For this reason, ΣE varies by ±0.15% about the center line as shown by FIG. 8b. The calculation error of the rectification-addition method at the same sampling period is ±0.62% showing that this invention greatly improves the accuracy.

Where the sampling period is made to be 22.5° that is n=4, in view of the periodicity shown in FIG. 7a, a value of $\Sigma E=E(\omega t)+\Sigma(\omega t+22.5°)$ produced by the addition circuit 3 is sufficient. In other words, addition of (n/2) times gives a result similar to that of the addition of n times. When a calculation is made in the same manner as in the previous example, the error would be ±0.97% but it is possible to obtain the same result by using smaller number of data than the first embodiment.

In the foregoing example, the three consecutive outputs of the operation circuit 2 were sequentially added three times when the sampling period is 30°, four times (actually twice) is sufficient due to the periodicity when the sampling period is 22.5° and five times when the sampling period is 18°. Generally speaking, during a ¼ period (90°) of the input sine wave the sampling is made n times and the sampled values are sequentially operated by the operation circuit 2 and n outputs thereof are added together. The number of addition n may be any other integer. More particularly, where a positive integer l is selected and the sampling is made n times during an interval of 90°, the result of addition of lxn times of the outputs of the operation circuit 2 is multiplied by l in view of the periodicity shown in FIG. 7a, thus giving the same degree of accuracy.

Although in the foregoing examples, sampling was made n times during ¼ period, generally speaking it is possible to sample at a rate of n during a (2m−1)¼ period, where m represents a positive integer. As an example, a case when m=3 and n=3, that is the sampling is made 3 times (at an interval of 150°) during (5/4) period will be considered as follows. In this case, the time series is represented by i, the sampled value by Si, and the original wave of Si by sinωt, then $$\begin{aligned}|Si| &= |\sin\omega t| \\ |Si+1| &= |\sin(\omega t + 150°)| = |\sin(\omega t - 30°)| \\ |Si+2| &= |\sin(\omega t + 300°)| = |\sin(\omega t - 60°)| \\ |Si+3| &= |\sin(\omega t + 450°)| = |\sin(\omega t - 90°)|\end{aligned} \quad (11)$$

Figure 9:
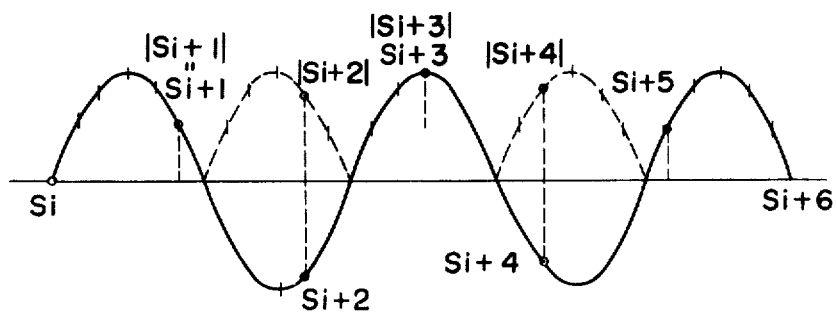
FIG. 9 is a graph showing the variation in the sampled values where m=3 and n=3.

Equation 11 shows that $|Si| \sim |Si+3|$ are equivalent to sampled values respectively having a phase difference of 30°. This is shown by FIG. 9. Accordingly, when the operations are made by the operation circuit 2 by using $|Si|$ and $|Si+3|$, $|Si+1|$ and $|Si+4|$, $|Si+2|$ and $|Si+5|$ so on, and the three outputs are sequentially added, the same value as in equation 9 can be obtained in which addition operations are made three times at a sampling interval of 30°.

The sampled values utilized in the operation circuit 2 are not always required to have a phase difference of 90° as illustrated by the above examples. Generally speaking, values different by (2m'−1)×90° period should be used. m' may not always be equal to m. For example, where m=1 and the sampling is made n times at each ¼ period m' may be 2. In other words, even when the operating circuit 2 is operated by using two sampled values having a phase difference of 270°, the same result can be obtained.

Figure 11:
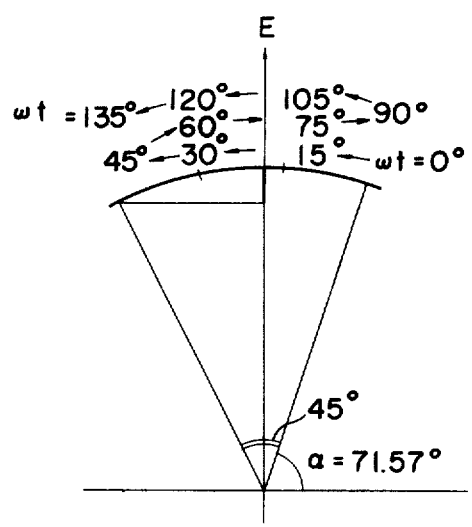
FIG. 11 is a vector diagram showing the periodicity of E where K=0.5.

Although in the foregoing example, an amplitude value shown by equation 7 was calculated by the operation circuit 2 by using sampled values having a phase difference of 90° and the outputs of the operation circuit 2 are sequentially added together by the addition circuit 3, the circuits 2 and 3 may be combined into an integral unit 5 as shown in FIG. 11. The integral unit or overall operation circuit 5 functions as follows. In this case, when an input AC having a frequency of 50 Hz is sampled by a sampling frequency of 600 Hz, h becomes 12.

$$E = \text{Max}[|Si| + |Si+1|] + \text{Max}[|Si+1|, |Si+2|] \quad (13)$$
$$+ \ldots + \text{Max}\left[\left|Si+\frac{h}{4}-2\right|, \left|Si+\frac{h}{4}-1\right|\right]$$
$$+ \text{Min}[|Si| + |Si+1|] + \text{Min}[|Si+1|, |Si+2|]$$
$$+ \ldots + \text{Min}\left[\left|Si+\frac{h}{4}-2\right|, \left|Si+\frac{h}{4}-1\right|\right]$$

Figure 10:
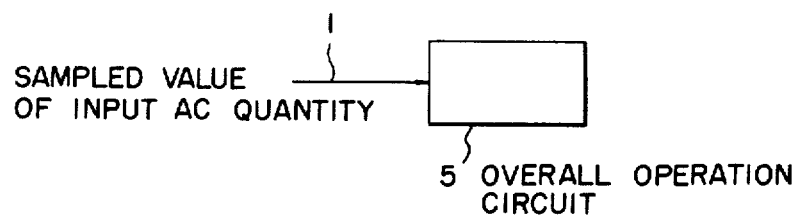
FIG. 10 is block diagram of a modified amplitude value calculating circuit in which various operating units are combined into a single operating circuit.

Then, the circuit shown in FIG. 10 can give the same result as the circuit shown in FIG. 6.

Although in the foregoing description all calculations of $E(\omega t)$ by the operation circuit 2 were made in accordance with equation 7, similar result can be obtained by using other different equations. Thus, as will be clear from the following description the same result can be obtained even when the sum or difference of either one of $\text{Max}(|Si|, |Sm+h/4|)$ or $\text{Min}(|Sm|, |Sm+h/4|)$, and the absolute values $Sm$ and $Sm+(h/4)$ are used.

$$E = \text{Max}(|Sm|, \left|Sm+\frac{h}{4}\right|) + K_1 \cdot (|Sm| + \left|Sm+\frac{h}{4}\right|) \quad (14)$$
$$= (1 + K_1)\text{Max}(|Sm|, \left|Sm+\frac{h}{4}\right|) +$$
$$K_1 \cdot \text{Min}(|Sm|, \left|Sm+\frac{h}{4}\right|)$$

$$E = \text{Max}(|Sm|, \left|Sm+\frac{h}{4}\right|) + K_2 \left||Sm| - \left|Sm+\frac{h}{4}\right|\right| \quad (15)$$
$$= (1 + K_2)\text{Max}(|Sm|, \left|Sm+\frac{h}{4}\right|) - K_2 \cdot \text{Min}(|Sm|,$$
$$\left|Sm+\frac{h}{4}\right|)$$

$$E = |Sm| + \left|Sm+\frac{h}{4}\right| + K_3 \cdot \text{Min}(|Sm|, \left|Sm+\frac{h}{4}\right|) \quad (16)$$
$$= \text{Max}(|Sm|, \left|Sm+\frac{h}{4}\right|) + (1 + K_3)\text{Min}(|Sm|, \left|Sm+\frac{h}{4}\right|)$$

$$E = \left||Sm| - \left|Sm+\frac{h}{4}\right|\right| + K_4 \cdot \text{Min}(Sm, Sm+\frac{h}{4}) \quad (17)$$
$$= \text{Max}(|Sm|, \left|Sm+\frac{h}{4}\right|) + (K_4 - 1)\text{Min}(|Sm|,$$
$$\left|Sm+\frac{h}{4}\right|)$$

By using either one of the equations 14–17, it is possible to obtain a value of E given by an equation where suitable constants $K_1 - K_4$ and coefficients are used. In the same manner, the sum and difference of the absolute values of $Sm$ and $Sm+h/4$ can also be used as shown in the following equation.

$$E = |Sm| + \left|Sm+\frac{h}{4}\right| + K_5 \left||Sm| - \left|Sm+\frac{h}{4}\right|\right| \quad (18)$$

$$= (1 + K_5) \cdot \text{Max}(|Sm|, \left|Sm+\frac{h}{4}\right|) + (1 - K_5) \cdot$$
$$\text{Min}(|Sm|, \left|Sm+\frac{h}{4}\right|)$$

It can be noted that where a suitable value is selected for constant K, equation 18 becomes equivalent to equation 7. For this reason, by using equations 14–18, the same result as in equation 6 can be obtained.

While in the foregoing description, the value of K was selected to the optimum value 0.414, that is $\alpha = 67.5°$, in an actual use, where K is selected to be 0.5, the multiplying operation of K can be made in a computer by a single shift instruction so that the burden of the computer is extremely light and yet the result of calculation is satisfactory. In the following, an example of the calculation error will be described where $K = 0.5$, that is, $m = 1$, $n = 3$ and addition operation is made three times at a sampling interval of 30°.

When $K = 0.5$, in equation 6, $\alpha = 71.57°$. Accordingly, the outputs of the operation circuit 2 with reference to $\omega t$ can be shown by FIG. 11 from which it can be noted that the sum of the three consecutive output of the operation circuit 2, that is, $$\Sigma E = E(\omega t) + E(\omega t + 30°) + E(\omega t + 60°)$$

varies periodically at an interval of at least 30°.

The values of $\Sigma E$ will be considered by dividing the 30° period into (A), $0° \leq \omega t < 15°$ and (B), $15° \leq \omega t \leq 30°$. (A) In the case of $0 \leq \omega t < 15°$.

In this case, equation of $\Sigma E$ takes the same form as equation 9, and by substituting $\alpha = 71.57°$ in equation 9, $\theta$ becomes 83.80°. Accordingly, the upper limit of a range in which $\sin(\omega t + \theta)$ varies is 1.0 and the minimum value of $\sin(15° + 83.80°) = 0.988$ so that the error is $\pm 0.592\%$ with respect to the center of variation. (B) In the case of $15° \leq \omega t \leq 30°$.

When the value of $\omega t'$ expressed by $0 \leq \omega t' \leq 15°$ is substituted, the value of $\Sigma E$ is expressed by the following equation.

$$\begin{aligned}\Sigma E &= \sin(\omega t' + \alpha + 15°) + \sin(-\omega t' + \alpha + 15°) \\ &\quad + \sin(-\omega t' + \alpha + 45°) \\ &= 2\sin(\alpha + 15°) \cdot \cos\omega t' + \sin(\alpha + 45°) \cdot \cos\omega t' \\ &\quad - \cos(\alpha + 45°) \cdot \sin\omega t' \\ &= \sqrt{\cos^2(\alpha + 45°) + [2\sin(\alpha + 15°) + \sin(\alpha + 45°)]^2} \cdot \\ &\quad \sin(\omega' + \theta)\end{aligned} \quad (19)$$

where $\sin\theta = [2\sin(\alpha + 15°) + \sin(\alpha + 45°)] /$
$$\sqrt{\cos^2(\alpha + 45°) + [2\sin(\alpha + 15°) + \sin(\alpha + 45°)]^2}$$
$\cos\theta = \cos(\alpha + 45°) /$
$$\sqrt{\cos^2(\alpha + 45°) + [2\sin(\alpha + 15°) + \sin(\alpha + 45°)]^2}$$

By substituting $\alpha = 71.57°$ in equation 14, we obtain $\theta = 81.20°$. Thus, in the case of $0 \leq \omega t' \leq 15°$, the value of $(\omega t' + \theta)$ in equation 19 varies between a maximum value 1.0 and a minimum value $\sin(81.20) = 0.988$ meaning that the error is $\pm 0.592\%$ about the center of variation.

Since the coefficient $\sqrt{\cos^2\alpha + [\sin\alpha + 2\sin(\alpha + 30°)]^2}$ of equation 9 and that $\sqrt{\cos^2(\alpha+45°) + [2\sin(\alpha+15°) + \sin(\alpha+45°)]^2}$ of equation 14 are the same, that is 8.56 when $\alpha = 71.57°$, it can be understood that the error of $\Sigma E$ is less than $\pm 0.592\%$ for the entire range. This value is little larger than the error $\pm 0.43\%$ which occurs when K is selected to be an optimum value 0.414 but substantially smaller than the error ±1.7% in the case of rectification-addition method.

As above described according to the distance relaying system of this invention since the principle of comparing the amplitude values of alternating current quantities is used, it is not only possible to decrease the calculation time than the prior art amplitude squaring method but also possible to improve the distance measuring characteristic than the rectification-addition method.

We claim:

1. A digital distance relaying system, comprising first means for determining an alternating current quantity $\dot{V}-\dot{I}\dot{Z}$, where $\dot{V}$ and $\dot{I}$ represent voltage and current of an alternating current system and $\dot{Z}$ a vector, second means for determining the amplitude value of the voltage $\dot{V}$, third means for determining the amplitude value of said alternating current quantity $\dot{V}-\dot{I}\dot{Z}$, and fourth means for comparing the outputs of said second and third means for determining the operating point of the relay system.

2. A digital distance relaying system comprising first means for determining an alternating current quantity $\dot{V}-\dot{I}\dot{Z}$, where $\dot{V}$ and $\dot{I}$ represent voltage and current of an alternating current system and $\dot{Z}$ a vector, second means for determining the amplitude value of $\dot{I}\dot{Z}$ third means for determining the amplitude value of $\dot{V}-\dot{I}\dot{Z}$, and fourth means for comparing the outputs of said second and third means for determining the operating point of the relay system.

3. The distance relaying system according to claim 2 wherein the output of said second means is multiplied by a predetermined coefficient.

4. The distance relaying system according to claim 1 or 2 wherein said voltage and current are sampled as analogue quantities and then converted into digital quantities.

* * * * *